United States Patent
Ikarashi et al.

(10) Patent No.: US 11,797,540 B2
(45) Date of Patent: Oct. 24, 2023

(54) SECRET JOINING SYSTEM, METHOD, SECRET CALCULATION APPARATUS AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 310 days.

(21) Appl. No.: 17/252,290

(22) PCT Filed: Jun. 13, 2019

(86) PCT No.: PCT/JP2019/023390
§ 371 (c)(1),
(2) Date: Dec. 15, 2020

(87) PCT Pub. No.: WO2019/244756
PCT Pub. Date: Dec. 26, 2019

(65) Prior Publication Data
US 2021/0263921 A1    Aug. 26, 2021

(30) Foreign Application Priority Data

Jun. 20, 2018  (JP) .................................. 2018-116576

(51) Int. Cl.
*G06F 16/2455*  (2019.01)
*G06F 21/62*    (2013.01)

(52) U.S. Cl.
CPC ...... *G06F 16/2456* (2019.01); *G06F 21/6254* (2013.01)

(58) Field of Classification Search
CPC .......... G06F 16/2456; G06F 7/24; G06F 7/76; G09C 1/00; H04L 9/0618; H04L 9/085
See application file for complete search history.

(56) References Cited

FOREIGN PATENT DOCUMENTS

| | | |
|---|---|---|
| JP | 2014-139640 A | 7/2014 |
| WO | 2018/061800 A1 | 4/2018 |

OTHER PUBLICATIONS

Koki Hamada, et al., "An Equijoin Algorithm Based on Non-unique Key Columns for Secure Multi-party Computation", The Institute of Electronics, Information and Communication Engineers, SCIS 2015, Jan. 23, 2015.

(Continued)

*Primary Examiner* — Ken Hoang
(74) *Attorney, Agent, or Firm* — XSENSUS LLP (57) ABSTRACT

A secure joining system is a secure joining system comprising a plurality of secure computation apparatuses; and the plurality of secure computation apparatuses are provided with vector joining parts $11_n$, first permutation calculating parts $12_n$, first permutation applying parts $13_n$, first vector generating parts $14_n$, second vector generating parts $15_n$, bit-flipping parts $16_n$, second permutation calculating parts $17_n$, second permutation applying parts $18_n$, third vector generating parts $19_n$, inverse permutation applying parts $110_n$, vector separating parts $111_n$, third permutation applying parts $112_n$, attribute value permutating parts $113_n$ and fourth vector generating parts $114_n$.

3 Claims, 4 Drawing Sheets

(56) References Cited

OTHER PUBLICATIONS

Sven Laur, et al., "From Oblivious AES to Efficient and Secure Database Join in the Multiparty Setting," Springer-Verlag Berlin Heidelberg, pp. 84-101, 2013.

Kiribuchi et al.,"An Efficient Equi-Join Algorithm for Secure Computation and Its Implementation Toward Secure Comprehensive Analyses of Users' Attribute and History Information", Computer Security Symposium 2016, Oct. 11-13, 2016, (pp. 1072-1078), 16 pages including English Translation.

SECRET JOINING SYSTEM, METHOD, SECRET CALCULATION APPARATUS AND PROGRAM

CROSS-REFERENCE TO RELATED APPLICATIONS

The present application is based on PCT filing PCT/JP2019/023390, filed Jun. 13, 2019, which claims priority to JP 2018-116576, filed Jun. 20, 2018, the entire contents of each are incorporated herein by reference.

TECHNICAL FIELD

This invention relates to secure computation technology. In particular, this invention relates to a technique for joining two tables while maintaining confidentiality.

BACKGROUND ART

In the field of secure computation technology, a technique for joining two tables while maintaining confidentiality is required.

As the technique for joining two tables while maintaining confidentiality, for example, a technique described in Non-patent literature 1 is known. In Non-patent literature 1, an equijoin with key duplication is realized.

PRIOR ART LITERATURE

Non-Patent Literature

Non-patent literature 1: "An Efficient Equi-Join Algorithm for Secure Computation and Its Implementation Toward Secure Comprehensive Analyses of Users' Attribute and History Information", Naoto Kiribuchi, Dai Ikarashi, Genbu Morohashi and Koki Hamada, CSS2016, 2016

SUMMARY OF THE INVENTION

Problems to be Solved by the Invention

This invention provides a secure joining system that, when there is no key duplication, joins two tables while maintaining confidentiality at a higher speed than the technique of Non-patent literature 1, a method, a secure computation apparatus and a program.

Means to Solve the Problems

A secure joining system according to one aspect of this invention is a secure joining system comprising a plurality of secure computation apparatuses, wherein F is an arbitrary ring, [α] represents shares obtained by α being secret-shared when α is an arbitrary vector, {{β}} represents shares obtained by β being secret-shared when β is an arbitrary permutation, $m_0$, $m_1$, $L_0$ and $L_1$ are integers equal to or larger than 1, $k_0 \in F^{m0}$ is a vector of keys of a first table, $k_1 \in F^{m1}$ is a vector of keys of a second table, $v_{0,p} \in F^{m0}$ is a vector of attribute values of attributes p of the first table when p=0, . . . , $L_0$−1 is assumed, $v_{1,q} \in F^{m1}$ is a vector of attribute values of attributes q of the second table when q=0, . . . , $L_1$−1 is assumed, and $\pi_0$ and $\pi_1$ are predetermined permutations of lengths $m_0$ and $m_1$, respectively; and the plurality of secure computation apparatuses are provided with: a plurality of vector joining parts generating shares [k'] of a vector $k' \in [F]^{m0+m1}$ obtained by joining the vector $k_0$ and the vector $k_1$, using shares [$k_0$] of the vector $k_0$ and shares [$k_1$] of the vector $k_1$; a plurality of first permutation calculating parts generating shares {{σ}} of a permutation σ that performs stable sorting of the vector k' in ascending order, using the shares [k']; a plurality of first permutation applying parts generating shares [σ(k')] of a vector σ(k') obtained by applying the permutation σ to the vector k', using the shares [k'] and the shares {{σ}}; a plurality of first vector generating parts generating shares [e] of a vector e that has 1 as an element corresponding to a certain element of the vector σ(k') if the certain element and an element next to the certain element are the same and has 0 as the element corresponding to the certain element if the certain element and the element next to the certain element are different, using the shares [σ(k')]; a plurality of second vector generating parts generating shares [e'] of a vector e' that has 1 as an element corresponding to a certain element of the vector e if one of the certain element and an element before the certain element is 1 and, otherwise, has 0 as the element corresponding to the certain element, using the shares [e]; a plurality of bit-flipping parts generating shares [e"] of a vector e" obtained by bit-flipping each element of the vector e', using the shares [e']; a plurality of second permutation calculating parts generating shares {{σ'}} of a permutation σ' that performs stable sorting of the vector e" in ascending order, using the shares [e"]; a plurality of second permutation applying parts generating shares [σ'(e")] of a vector σ'(e") obtained by applying the permutation σ' to the vector e", using the shares [e"] and the shares {{σ'}}; a plurality of third vector generating parts generating shares [x] of a vector x that has $\lfloor i/2 \rfloor$ as an element corresponding to a certain element i of the vector σ'(e") if the certain element i is 0 and has 0 as the element corresponding to the certain element i if the certain element i is not 0, using the shares [σ'(e")]; a plurality of inverse permutation applying parts generating shares [$\sigma^{-1}(\sigma'^{-1}(x))$] of a vector $\sigma^{-1}(\sigma'^{-1}(x))$ obtained by applying an inverse permutation $\sigma'^{-1}$ of the permutation σ' and an inverse permutation $\sigma^{-1}$ of the permutation σ to the vector x, using the shares [x], the shares {{σ}} and the shares {{σ'}}; a plurality of vector separating parts generating shares [$s_0$] of a vector $s_0$ composed of $m_0$ elements from the top of the vector $\sigma^{-1}(\sigma'^{-1}(x))$ and shares [$s_1$] of a vector $s_1$ composed of remaining $m_1$ elements of the vector $\sigma^{-1}(\sigma'^{-1}(x))$, using the shares [$\sigma^{-1}(\sigma'^{-1}(x))$]; a plurality of third permutation applying parts generating shares [$\pi_0(s_0)$] of a vector $\tau_0 := \pi_0(s_0)$ obtained by applying a permutation $\pi_0$ to the vector $s_0$ and shares [$\pi_1(s_1)$] of a vector $\tau_1 := \pi_1(s_1)$ obtained by applying a permutation $\pi_1$ to the vector $s_1$, using the shares [$s_0$], the shares [$s_1$] and the permutations $\pi_0$ and $\pi_1$, and publishing $\tau_0 := \pi_0(s_0)$ and $\tau_1 := \pi_1(s_1)$; a plurality of attribute value permutating parts generating shares [$v'_{0,p}$] of a vector $v'_{0,p}$ obtained by permutating a vector $v_{0,p}$ of attribute values of the attributes p of the first table by the permutation $\pi_0$ and shares [$v'_{1,q}$] of a vector $v'_{1,q}$ obtained by permutating a vector $v_{1,q}$ of attribute values of the attributes q of the second table by the permutation $\pi_1$, using the shares {{$\pi_0$}} of the permutation $\pi_0$, the shares {{$\pi_1$}} of the permutation $\pi_1$, the shares [$v_{0,p}$] of the vector $v_{0,p}$ and the shares [$v_{1,q}$] of the vector $v_{1,q}$; and a plurality of fourth vector generating parts generating shares [$v''_{0,p}$] of a vector $v''_{0,p}$ that has the i'-th element of the vector $v'_{0,p}$ as the (i'−1)th element if the i'-th element of the vector $\tau_0$ is not 0, and shares [$v''_{1,q}$] of a vector $v''_{1,q}$ that has the i'-th element of the vector $v'_{1,q}$ as the (i'−1)th element if the i'-th element of the vector $\tau_1$ is not 0, using the vector $\tau_0$, the vector $\tau_1$, the shares $[v'_{0,p}]$ and the shares $[v'_{1,q}]$.

Effects of the Invention

By using an inverse permutation, it is possible to, when there is no key duplication, join two tables while maintaining confidentiality at a higher speed than the technique of Non-patent literature 1.

DETAILED DESCRIPTION OF THE EMBODIMENT

An embodiment of this invention will be described below in detail. Note that, in the drawings, components having the same function will be given the same reference numeral, and duplicated description will be omitted.

Figure 1:
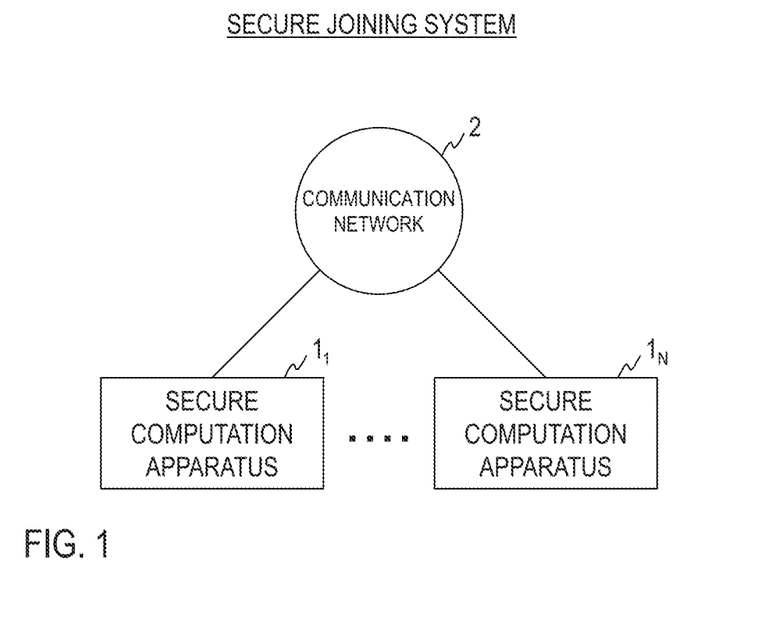
FIG. 1 is a diagram illustrating a functional configuration of a secure joining system.

A configuration example of a secure joining system of the embodiment will be described with reference to FIG. 1. The secure joining system includes N ($\geq 2$) secure computation apparatuses $1_1, \ldots, 1_N$. In the present embodiment, each of the secure computation apparatuses $1_1, \ldots, 1_N$ is connected to a communication network 2. The communication network 2 is a circuit-switched or packet-switched communication network configured so that the connected apparatuses can mutually communicate with one another, and is, for example, the Internet, a LAN (local area network), a WAN (wide area network) or the like. Note that each apparatus is not necessarily required to be able to communicate online via the communication network 2. For example, a configuration may be made in which information to be inputted to the secure computation apparatuses $1_1, \ldots, 1_N$ is stored into a portable recording recording medium such as a magnetic tape and a USB memory and inputted to the secure computation apparatuses $1_1, \ldots, 1_N$ from the portable recording medium offline.

Figure 2:
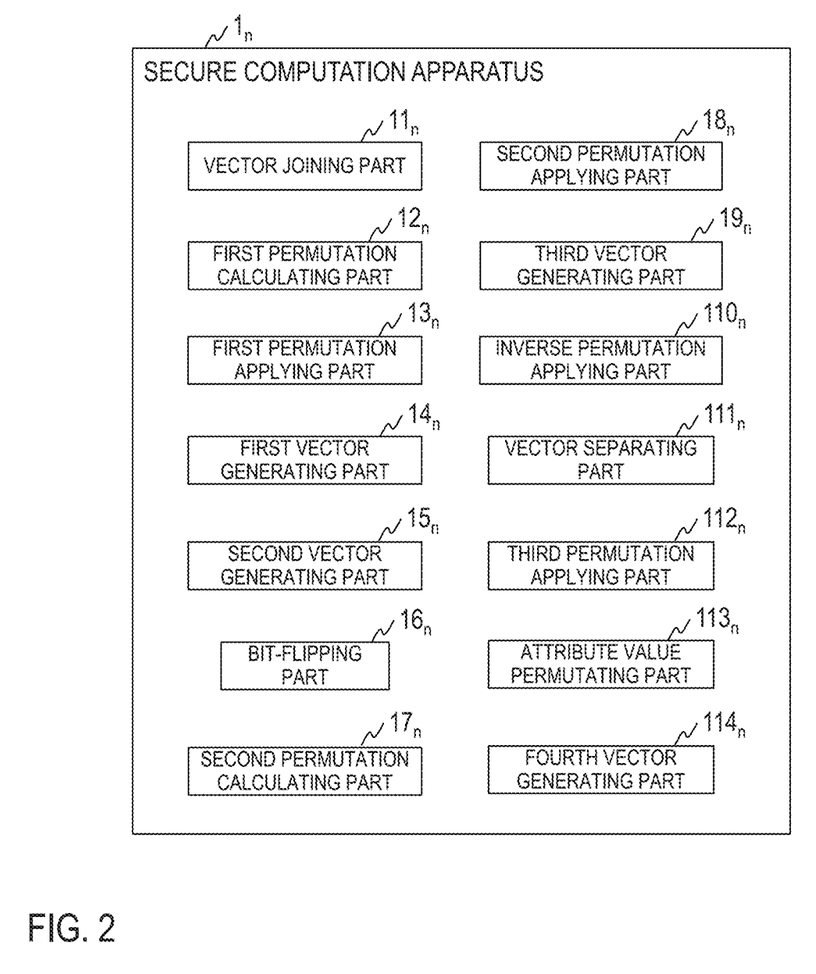
FIG. 2 is a diagram illustrating a functional configuration of a secure computation apparatus.

A configuration example of the secure computation apparatuses $1_n$ (n=1, . . . ,N) included in the secure joining system will be described with reference to FIG. 2. For example, as shown in FIG. 2, the secure computation apparatuses $1_n$ of the secure joining system are provided with vector joining parts $11_n$, first permutation calculating parts $12_n$, first permutation applying parts $13_n$, first vector generating parts $14_n$, second vector generating parts $15_n$, bit-flipping parts $16_n$, second permutation calculating parts $17_n$, second permutation applying parts $18_n$, third vector generating parts $19_n$, inverse permutation applying parts $110_n$, vector separating parts $111_n$, third permutation applying parts $112_n$, attribute value permutating parts $113_n$ and fourth vector generating parts $114_n$, respectively.

By each component of the secure computation apparatuses $1_n$ ($1 \leq n \leq N$) performing a process of each step described later in cooperation with each component of the other secure computation apparatuses $1_{n'}$ (n'=1, . . . ,N; n≠n'), a secure joining method of the embodiment is realized.

Note that the processing of each step is performed by secure computation. In other words, the secure computation apparatuses $1_n$ perform the process of each step without restoring shares, in other words, without knowing content of the shares.

Each of the secure computation apparatuses $1_n$ is, for example, a special apparatus configured by a special program being read into a well-known or dedicated computer having a central processing unit (CPU), a random access memory (RAM) and the like. For example, the secure computation apparatuses $1_n$ execute each process under the control of the central processing unit. Data inputted to the secure computation apparatuses $1_n$ and data obtained by each process are, for example, stored into the random access memory, and the data stored in the random access memory is read out to the central processing unit and used for other processes as necessary. At least a part of each component of the secure computation apparatuses $1_n$ may be configured with hardware such as an integrated circuit.

In the description below, it is assumed that $[\alpha]$ represents shares obtained by $\alpha$ being secret-shared when $\alpha$ is an arbitrary vector, and $\{\{\beta\}\}$ represents shares obtained by $\beta$ being secret-shared when $\beta$ is an arbitrary permutation.

Figure 3:
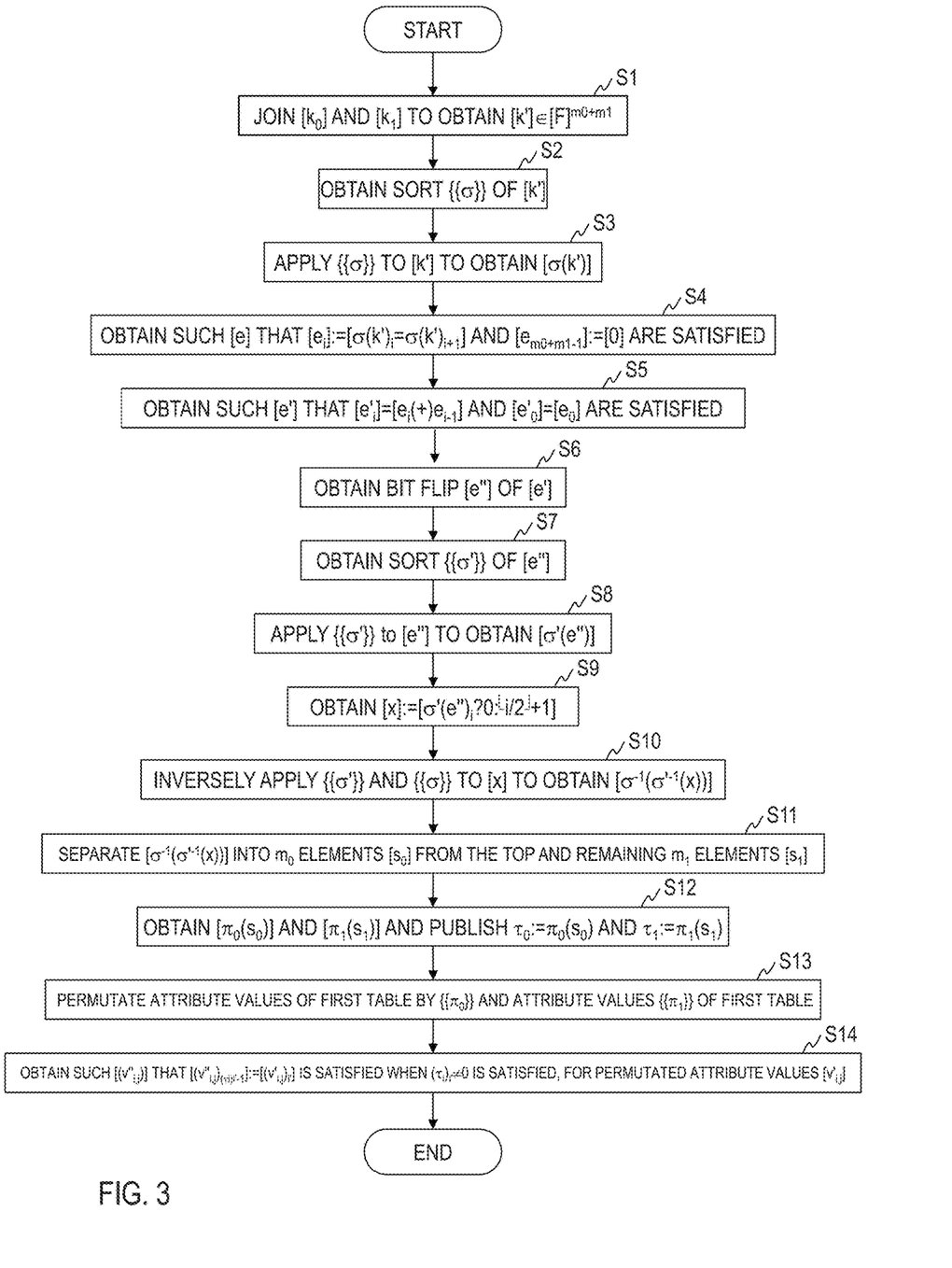
FIG. 3 is a diagram illustrating a process procedure of a secure joining method.

A process procedure of a secure joining method executed by the secure joining system of the embodiment will be described with reference to FIG. 3.

The secure joining system described below secretly and vertically joins a first table and a second table. In other words, the secure joining system described below obtains attribute values of the first table and attribute values of the second table about keys common to the first table and the second table while maintaining confidentiality It is assumed that $m_0$, $m_1$, $L_0$ and $L_1$ are integers equal to or larger than 1. Here, $m_0$, $m_1$, $L_0$ and $L_1$ may be the same values or may be different value.

The first table has $m_0$ records. Each of the $m_0$ records has one key and attribute values of $L_0$ attributes. It is assumed that $k_0 \in F^{m_0}$ is a vector of of keys of the first table. When p=0, . . . , $L_0$−1 is assumed, it is assumed that $v_{0,p} \in F^{m_0}$ is a vector of attribute values of attributes p of the first table. It is assumed that there are not duplicate keys in the first table.

Here, a superscript m0 of $[F]^{m_0}$ means "$m_0$". Thus, in a superscript, an expression of a further superscript or subscript may be omitted. Similarly, in a subscript, an expression of a further superscript or subscript may be omitted.

The second table has $m_1$ records. Each of the $m_1$ records has one key and attribute values of $L_1$ attributes. It is assumed that $k_1 \in F^{m_1}$ is a vector of keys of the second table. When q=0, . . . , $L_1$−1 is assumed, it is assumed that $v_{1,q} \in F^{m_1}$ is a vector of attribute values of attributes q of the second table. It is assumed that there are not duplicate keys in the second table.

For example, it is assumed that the number of records of the first table is three, and that the first table is configured with a key vector $k_0=(1,2,3)^T$ and an attribute value vector $v_{0,1}=(5,10,1)^T$ of one attribute z1.

Further, it is assumed that the number of records of the second table is four, and that the second table is configured with a key vector $k_1=(1,3,4,5)^T$ and an attribute value vector $v_{1,1}=(2,4,9,8)^T$ of one attribute z1'.

<Step S1>

Shares $[k_0]$ of the vector $k_0$ and shares $[k_1]$ of the vector $k_1$ are inputted to the vector joining parts $11_1, \ldots, 11_N$.

The vector joining parts $11_1, \ldots, 11_N$ join $[k_0]$ and $[k_1]$ to obtain $[k'] \in [F]^{m_0+m_1}$.

More specifically, the vector joining parts $11_1, \ldots, 11_N$ generate shares $[k']$ of a vector $k' \in [F]^{m_0+m_1}$ obtained by joining the vector $k_0$ and the vector $k_1$, using the shares $[k_0]$ of the vector $k_0$ and the shares $[k_1]$ of the vector $k_1$ (step S1).

The generated shares $[k']$ are outputted to the first permutation calculating parts $12_1, \ldots, 12_N$ and the first permutation applying parts $13_1, \ldots, 13_N$.

For example, the vector $k_0=(1,2,3)^T$ and the vector $k_1=(1,3,4,5)^T$ are assumed. In this case, the vector $k'=(1,2,3,1,3,4,5)^T$ is obtained.

<Step S2>

The shares $[k']$ are inputted to the first permutation calculating parts $12_1, \ldots, 12_N$.

The first permutation calculating parts $12_1, \ldots, 12_N$ obtain a sort $\{\{\sigma\}\}$ of $[k']$.

More specifically, the first permutation calculating parts $12_1, \ldots, 12_N$ generate shares $\{\{\sigma\}\}$ of a permutation $\sigma$ that performs stable sorting of the vector $k'$ in ascending order, using the shares $[k']$ (step S2).

The stable sorting refers to such that order of equal data before the sorting is stored after the sorting. The generation of the shares $\{\{\sigma\}\}$ of the permutation $\sigma$ that performs the stable sorting can be realized, for example, by a method of Reference Literature 1.

Reference Literature 1: "A Design and an Implementation of Super-High-Speed Multi-Party Sorting: The Day When Multi-Party Computation Reaches Scripting Languages", Dai Ikarashi, Koki Hamada, Ryo Kikuchi and Koji Chida, CSS2017, 2017

The generated shares $\{\{\sigma\}\}$ are outputted to the first permutation applying parts $13_1, \ldots, 13_N$ and the inverse permutation applying parts $110_1, \ldots, 110_N$.

For example, the vector $k'=(1,2,3,1,3,4,5)^T$ is assumed. In this case, the permutation $\sigma$ is as shown by Formula (1). For example, when it is assumed that numbers are written with 1 as start, each column $(i,j)^T$ of the permutation $\sigma$ means that the i-th element of the vector to which the permutation is applied is moved to the j-th position.

[Formula 1]

$$\sigma = \begin{pmatrix} 1 & 2 & 3 & 4 & 5 & 6 & 7 \\ 1 & 3 & 4 & 2 & 5 & 6 & 7 \end{pmatrix} \quad (1)$$

Note that each element of the vector $k'$ may be such that is obtained by bit decomposition. In other words, each element of the vector $k'$ may be such that is expressed by 0 and 1 bits.

<Step S3>The shares $[k']$ and the shares $\{\{\sigma\}\}$ are inputted to the first permutation applying parts $13_1, \ldots, 13_N$.

The first permutation applying parts $13_1, \ldots, 13_N$ apply $\{\{\sigma\}\}$ to $[k']$ to obtain $[\sigma(k')]$.

More specifically, the first permutation applying parts $13_1, \ldots, 13_N$ generate shares $[\sigma(k')]$ of a vector $\sigma(k')$ obtained by applying the permutation $\sigma$ to the vector $k'$, using the shares $[k']$ and the shares $\{\{\sigma\}\}$ (step S3).

The generated shares $[\sigma(k')]$ are outputted to the first vector generating parts $14_1, \ldots, 14_N$.

For example, the vector $k'=(1,2,3,1,3,4,5)^T$ is assumed, and it is assumed that the permutation $\sigma$ is the permutation indicated by Formula (1) above. In this case, the vector $\sigma(k')=(1,1,2,3,3,4,5)^T$ is Obtained.

<Step S4>

The shares $[\sigma(k')]$ are inputted to the first vector generating parts $14_1, \ldots, 14_N$.

The first vector generating parts $14_1, \ldots, 14_N$ obtain such $[e]$ that $[e_i]:=[\sigma(k')_i=\sigma(k')_{i+1}]$ and $[e_{m0+m1-1}]:=[0]$ are satisfied. When i is an integer equal to or larger than 0, $e_i$ means the i-th element of a vector $e$, and $\sigma(k')_i$ means the i-th element of the vector $\sigma(k')$. Thus, when i is an integer equal to or larger than 0, the subscript i of a vector means the i-th element of the vector. Here, ":=" means to substitute a value on the right of ":=" for a variable on the left of ":=". For example, a:=b means to substitute the value of b for a variable a.

Note that, when the number of elements of a vector is assumed to be M, the first element of the vector is called the 0th element, the next element of the vector is called the 1st element, and the last element of the vector is called the (M−1)th element.

More specifically, the first vector generating parts $14_1, \ldots, 14_N$ generate shares $[e]$ of a vector $e$ that has 1 as an element corresponding to a certain element of the vector $\sigma(k')$ if the certain element and an element next to the certain element are the same and has 0 as the element corresponding to the certain element if the certain element and the element next to the certain element are different, using the shares $[\sigma(k')]$ (step S4). Here, it is assumed that the last element of the vector $e$ is 0.

The generated shares $[e]$ are outputted to the second vector generating parts $15_1, \ldots, 15_N$.

For example, the vector $\sigma(k')=(1,1,2,3,3,4,5)^T$ is assumed. In this case, the vector $e=(1,0,0,1,0,0,0)^T$ is obtained.

<Step S5>

The shares $[e]$ are inputted to the second vector generating parts $15_1, \ldots, 15_N$.

The second vector generating parts $15_1,\ldots,15_N$ obtain such $[e']$ that $[e'_i]=[e_i(+)e_{i-1}]$ and $[e'_0]=[e_0]$ are satisfied. Here, (+) indicates exclusive-OR or addition, More specifically, the second vector generating parts $15_1, \ldots, 15_N$ generate shares $[e']$ of a vector $e'$ that has 1 as an element corresponding to a certain element of the vector $e$ if one of the certain element and an element before the certain element is 1 and, otherwise, has 0 as the element corresponding to the certain element, using the shares $[e]$ (step S5). Here, it is assumed that the first element of the vector $e'$ is the same as the first element of the vector $e$.

The generated shares $[e']$ are outputted to the bit-flipping parts $16_1, \ldots, 16_N$.

For example, the vector $e=(1,0,0,1,0,0,0)^T$ is assumed. In this case, the vector $e'=(1,1,0,1,1,0,0)^T$ is obtained.

<Step S6>

The shares $[e']$ are inputted to the bit-flipping parts $16_1, \ldots, 16_N$.

The bit-flipping parts $16_1, \ldots, 16_N$ obtain a bit flip $[e'']$ of $[e']$.

More specifically, the bit-flipping parts $16_1, \ldots, 16_N$ generate shares $[e'']$ of a vector $e''$ obtained by bit-flipping each element of the vector $e'$, using the shares $[e']$ (step S6).

The generated shares $[e'']$ are outputted to the second permutation calculating parts $17_1, \ldots, 17_N$ and the second permutation applying parts $18_1, \ldots, 18_N$.

For example, $e'=(1,1,0,1,1,0,0)^T$ is assumed. In this case, the vector $e''=(0,0,1,0,0,1,1)^T$ is obtained.

Note that, if each element of the vector $k'$ is such that is obtained by bit decomposition, a ring of $e''$ may be changed, for example, by mod P conversion, Here, P is a prime number equal to or larger than 3. The mod P conversion can be realized, for example, by a method described in Scheme 5 of Reference Literature 1.

<Step S7>

The shares $[e'']$ are inputted to the second permutation calculating parts $17_1, \ldots, 17_N$.

The second permutation calculating parts $17_1, \ldots, 17_N$ obtain a sort $\{\{\sigma'\}\}$ of $[e'']$.

More specifically, the second permutation calculating parts $17_1, \ldots, 17_N$ generate shares $\{\{\sigma'\}\}$ of a permutation $\sigma'$ that performs stable sorting of the vector e" in ascending order, using the shares [e"] (step S7).

The generated shares $\{\{\sigma'\}\}$ are outputted to the second permutation applying parts $18_1, \ldots, 18_N$ and the inverse permutation applying parts $110_1, \ldots, 110_N$.

For example, the vector e"$=(0,0,1,0,0,1,1)^T$ is assumed. In this case, the permutation $\sigma'$ is as shown by Formula (2).

[Formula 2]

$$\sigma' = \begin{pmatrix} 1 & 2 & 3 & 4 & 5 & 6 & 7 \\ 1 & 2 & 5 & 3 & 4 & 6 & 7 \end{pmatrix} \quad (2)$$

<Step S8>

The shares [e"] and the shares $\{\{\sigma'\}\}$ are inputted to the second permutation applying parts $18_1, \ldots, 18_N$.

The second permutation applying parts $18_1, \ldots, 18_N$ apply $\{\{\sigma'\}\}$ to [e"] to obtain $[\sigma'(e")]$.

More specifically, the second permutation applying parts $18_1, \ldots, 18_N$ generate shares $[\sigma'(e")]$ of a vector $\sigma'(e")$ obtained by applying the permutation $\sigma'$ to the vector e", using the shares [e"] and the shares $\{\{\sigma'\}\}$ (step S8).

The generated shares $[\sigma'(e")]$ are outputted to the third vector generating parts $19_1, \ldots, 19_N$.

For example, the vector e"$=(0,0,1,0,0,1,1)^T$ is assumed, and it is assumed that the permutation $\sigma'$ is the permutation indicated by Formula (2) above. In this case, the vector $\sigma'(e")=(0,0,0,0,1,1,1)^T$ is obtained.

<Step S9>

The shares $[\sigma'(e")]$ are inputted to the third vector generating parts $19_1, \ldots, 19_N$.

The third vector generating parts $19_1, \ldots, 19_N$ obtain $[x] := [\sigma'(e")]_i ?0 : \lfloor i/2 \rfloor + 1$.

More specifically, the third vector generating parts $19_1, \ldots, 19_N$ generate shares [x] of a vector x that has $\lfloor i/2 \rfloor$ as an element corresponding to a certain element i of the vector $\sigma'(e")$ if the certain element i is 0 and has 0 as the element corresponding to the certain element i if the certain element i is not 0, using the shares $[\sigma'(e")]$ (step S9).

Here, $i=0, \ldots, m_0+m_1-1$ is assumed, and $\lfloor i/2 \rfloor$ means the largest integer that is equal to or smaller than $i/2$.

The generated shares [x] are outputted to the inverse permutation applying parts $110_1, \ldots, 110_N$.

For example, the vector $\sigma'(e")=(0,0,0,0,1,1,1)^T$ is assumed. In this case, the vector $x=(1,1,2,2,0,0,0)^T$ is obtained.

<Step S10>

The shares [x], the shares $\{\{\sigma\}\}$ and the shares $\{\{\sigma'\}\}$ are inputted to the inverse permutation applying parts $110_1, \ldots, 110_N$.

The inverse permutation applying parts $110_1, \ldots, 110_N$ inversely apply $\{\{\sigma'\}\}$ and $\{\{\sigma\}\}$ to [x] to obtain $[\sigma^{-1}(\sigma'^{-1}(x))]$.

More specifically, the inverse permutation applying parts $110_1, \ldots, 110_N$ generate shares $[\sigma^{-1}(\sigma'^{-1}(x))]$ of a vector $\sigma^{-1}(\sigma'^{-1}(x))$ obtained by applying an inverse permutation $\sigma'^{-1}$ of the permutation $\sigma'$ and an inverse permutation $\sigma^{-1}$ of the permutation $\sigma$ to the vector x, using the shares [x], the shares $\{\{\sigma\}\}$ and the shares $\{\{\sigma'\}\}$ (step S10).

The generated shares $[\sigma^{-1}(\sigma'^{-1}(x))]$ are outputted to the vector separating parts $111_1, \ldots, 111_N$.

For example, the vector $x=(1,2,2,0,0,0,0)^T$ is assumed, and it is assumed that the permutation $\sigma$ is the permutation indicated by Formula (1) above, and the permutation $\sigma'$ is the permutation indicated by Formula (2) above. In this case, the vector $\sigma^{-1}(\sigma'^{-1}(x))=(1,0,2,1,2,0,0)^T$ is obtained.

<Step S11>

The shares $[\sigma^{-1}(\sigma'^{-1}(x))]$ are inputted to the vector separating parts $111_1, \ldots, 111_N$.

The vector separating parts $111_1, \ldots, 111_N$ separate $[\sigma^{-1}(\sigma'^{-1}(x))]$ into $m_0$ elements $[s_0]$ from the top and remaining $m_1$ elements $[s_1]$.

More specifically, the vector separating parts $111_1, \ldots, 111_N$ generate shares $[s_0]$ of a vector $s_0$ composed of the $m_0$ elements from the top of the vector $\sigma^{-1}(\sigma'^{-1}(x))$ and shares $[s_1]$ of a vector $s_1$ composed of the remaining $m_1$ elements of the vector $\sigma^{-1}(\sigma'^{-1}(x))$ using the shares $[\sigma^{-1}(\sigma'^{-1}(x))]$ (step S11).

The generated shares $[s_0]$ and shares $[s_1]$ are outputted to the third permutation applying parts $112_1, \ldots, 112_N$.

For example, the vector $\sigma^{-1}(\sigma'^{-1}(x))=(1,0,2,1,2,0,0)^T$ is assumed. In this case, the vector $s_0=(1,0,2)^T$ and the vector $s_1=(1,2,0,0)^T$ are obtained.

The vectors $s_0$ and $s_1$ show positions of duplicate keys between the first and second tables. For example, it is assumed that the key vector of the first table is $k_0=(1,2,3)^T$, and the key vector of the second table is $k_1=(1,3,4,5)^T$. In this case, the vector $s_0=(1,0,2)^T$ and the vector $s_1=(1,2,0,0)^T$ are obtained. The duplicate keys between the first and second tables are "1" and "3". The vector $s_0=(1,0,2)^T$ and the vector $s_1=(1,2,0,0)^T$ show positions of "1" and "3" in the vectors $k_0=(1,2,3)^T$ and $k_1=(1,3,4,5)^T$, respectively.

<Step S12>

The shares $[s_0]$ and the shares $[s_1]$ are inputted to the third permutation applying parts $112_1, \ldots, 112_N$.

The third permutation applying parts $112_1, \ldots, 112_N$ obtain $[\pi_0(s_0)]$ and $[\pi_1(s_1)]$ and publish $\tau_0 := \pi_0(s_0)$ and $\tau_1 := \pi_1(s_1)$.

More specifically, the third permutation applying parts $112_1, \ldots, 112_N$ generate shares $[\pi_0(s_0)]$ of a vector $\tau_0 := \pi_0(s_0)$ obtained by applying a permutation $\pi_0$ to the vector $s_0$ and shares $[\pi_1(s_1)]$ of a vector $\tau_1 := \pi_1(s_1)$ obtained by applying a permutation $\pi_1$ to the vector $s_1$, using the shares $[s_0]$, the shares $[s_1]$ and the permutations $\pi_0$ and $\pi_1$, and publish the vector $\tau_0$ and the vector $\tau_1$ (step S12). The vector $\tau_0$ and the vector $\tau_1$ are published to the secure computation apparatuses $1_n$ ($1 \leq n \leq N$).

The permutations $\pi_0$ and $\pi_1$ are predetermined permutations, for example, random permutations. The permutations $\pi_0$ and $\pi_1$ may be permutations determined in advance or may be generated at the time of perthrming the process of step S12. The permutations $\pi_0$ and $\pi_1$ and shares $\{\{\pi_0\}\}$ and $\{\{\pi_1\}\}$ thereof can be generated, for example, by a method described in Paragraph 4.1 of Reference Literature 1. It is assumed that the secure computation apparatuses $1_n$ ($1 \leq n \leq N$) have information about the permutations $\pi_0$ and $\pi_1$ and the shares $\{\{\pi_0\}\}$ and $\{\{\pi_1\}\}$ thereof and can perform calculation using the permutations $\pi_0$ and $\pi_1$ and the shares $\{\{\pi_0\}\}$ and $\{\{\pi_1\}\}$ thereof.

The generated shares $[\pi_0(s_0)]$ and shares $[\pi_1(s_1)]$ are outputted to the attribute value permutating parts $113_1, \ldots, 113_N$.

For example, the vector $s_0=(1,0,2)^T$ and the vector $s_1=(1,2,0,0)^T$ are assumed, and it is assumed that $\pi_0$ is a permutation indicated by Formula (3) below, and $\pi_1$ is a permutation indicated by Formula (4) below.

[Formula 3]

$$\pi_0 = \begin{pmatrix} 1 & 2 & 3 \\ 3 & 1 & 2 \end{pmatrix} \quad (3)$$

$$\pi_1 = \begin{pmatrix} 1 & 2 & 3 & 4 \\ 2 & 4 & 1 & 3 \end{pmatrix} \quad (4)$$

In this case, the vector $\tau_0=(0,2,1)^T$ and the vector $\tau_1=(0,1,0,2)^T$ are obtained.

\<Step S13>

Shares $[v_{0,p}]$ and shares $[v_{1,q}]$ are inputted to the attribute value permutating parts $113_1, \ldots, 113_N$.

The attribute value permutating parts $113_1, \ldots, 113_N$ permutate each attribute value of the first table by $\{\{\pi_0\}\}$ and permutate each attribute value of the second table by $\{\{\pi_1\}\}$.

More specifically, the attribute value permutating parts $113_1, \ldots, 113_N$ generate shares$[v'_{0,p}]$ of a vector $v'_{0,p}$ obtained by permutating a vector $v_{0,p}$ of attribute values of the attributes p (p=0, ..., $m_0-1$) of the first table by the permutation $\pi_0$ and shares $[v'_{1,q}]$ of a vector $v'_{1,q}$ obtained by permutating a vector $v_{1,q}$ of attribute values of the attributes q (q=0, ..., $m_1-1$) of the second table by the permutation $\pi_1$, using the shares $\{\{\pi_0\}\}$ of the permutation $\pi_0$, the shares $\{\{\pi_1\}\}$ of the permutation $\pi_1$, the shares $[v_{0,p}]$ of the vector $v_{0,p}$ and the shares $[v_{1,q}]$ of the vector $v_{1,q}$ (step S13).

The generated shares $[v'_{0,p}]$ and shares $[v'_{1,q}]$ are outputted to the fourth vector generating parts $114_1, \ldots, 114_N$.

For example, it is assumed that the vector of the attribute z1 of the first table is $v_{0,1}=(5,10,1)^T$, the vector of the attribute z1' of the second table is $v_{1,1}=(2,4,9,8)^T$, $\pi_0$ is the permutation indicated by Formula (3) above, and $\pi_1$ is the permutation indicated by Formula (4) above. In this case, the vector $v'_{0,1}=(10,1,5)^T$ and the vector $v'_{1,1}=(9,2,8,4)^T$ are obtained.

\<Step S14>

The vector $\tau_0$, the vector $\tau_1$, the shares $[v'_{0,p}]$ and the shares $[v'_{1,q}]$ are inputted to the fourth vector generating parts $114_1, \ldots, 114_N$.

The fourth vector generating parts $114_1, \ldots, 114_N$ obtain such $[(v''_{i,j})]$ that $[(v''_{i,j})_{(\tau i)i'-1}]:=[(v'_{i,j})_{i'}]$ is satisfied when $(\tau_i)_{i'} \neq 0$ is satisfied, for permutated attribute values $[v'_{i,j}]$, wherein i=1,2 is assumed.

More specifically, the fourth vector generating parts $114_1, \ldots, 114_N$ generate shares $[v''_{0,p}]$ of a vector $v''_{0,p}$ that has the i'-th element of the vector $v'_{0,p}$ as the (i'−1)th element if the i'-th element of the vector $\tau_0$ is not 0, and shares $[v''_{1,q}]$ of a vector $v''_{1,q}$ that has the i'-th element of the vector $v'_{1,q}$ as the (i'−1)th element if the i'-th element of the vector $\tau_1$ is not 0, using the vector $\tau_0$, the vector $\tau_1$, the shares $[v'_{0,p}]$ and the shares $[v'_{1,q}]$ (step S14). The fourth vector generating parts $114_1, \ldots, 114_N$ perform this process thr each of p (p=0, ..., $L_0-1$) and each of q (q=0, ..., $L_1-1$).

For example, the vector $\tau_0=(0,2,1)^T$, the vector $v'_{0,1}=(10,1,5)^T$, the vector $\tau_1=(0,1,0,2)^T$ and the vector $v'_{1,1}=(9,2,8,4)^T$ are assumed. In this case, a vector $v''_{0,1}=(5,1)^T$ and a vector $v''_{1,1}=(2,4)^T$ are obtained.

Since the vectors $s_0$ and $s_1$ show positions of duplicate keys between the first and second tables, the vectors $\tau_0$ and $\tau_1$ obtained by permutating the vectors $s_0$ and $s_1$ by the permutations $\pi_0$ and $\pi_1$, respectively, show positions of duplicate keys between the first table and the second table after permutation by the permutations $\pi_0$ and $\pi_1$.

In the example described above, the second element "1" of the vector $\tau_0=(0,2,1)^T$ shows a position of the key "1" in the first table after permutation by the permutation $\pi_0$, and the first element "2" of the vector $\tau_0=(0,2,1)^T$ shows a position of the key "3" in the first table after permutation by the permutation $\pi_0$.

Similarly, in the example described above, the first element "1" of the vector $\tau_1=(0,1,0,2)^T$ shows a position of the key "1" in the second table after permutation by the permutation $\pi_1$, and the third element "2" of the vector $\tau_1=(0,1,0,2)^T$ shows a position of the key "3" in the second table after permutation by permutation $\pi_1$.

Therefore, by causing $[(v''_{i,j})_{(\tau i)i'-1}]:=[(v'_{i,j})_{i'}]$ to be satisfied when $(\tau_i)_{i'} \neq 0$ is satisfied, it is possible to cause the attribute value "5" of the attribute z1 of the record with the key "1" in the first table to be the 0th element of the vector $v''_{0,1}=(5,1)^T$ and cause the attribute value "1" of the attribute z1 of the record with the key "3" in the first table to be the first element of the vector $v''_{0,1}=(5,1)^T$.

Further, it is possible to cause the attribute value of "2" of the attribute z1' of the record with the key "1" in the second table to be the 0th element of the vector $v''_{1,1}=(2,4)^T$ and cause the attribute value of "4" of the attribute z1' of the record with the key "3" in the second table to be the first element of the vector $v''_{1,1}=(2,4)^T$.

In other words, the 0th element "5" of the vector $v''_{0,1}=(5,1)^T$ is the attribute value of the attribute z1 of the record with the key "1" in the first table, and the first element "1" of the vector $v''_{0,1}=(5,1)^T$ is the attribute value of the attribute z1 of the record with the key "3" in the first table.

Further, the 0th element "2" of the vector $v''_{1,1}=(2,4)^T$ is the attribute value of the attribute z1' of the record with the key "1" in the second table, and the first element "4" of the vector $v''_{1,1}=(2,4)^T$ is the attribute value of the attribute z1' of the record with the key "3" in the second table.

Thus, it can be said that the vector $v''_{0,1}=(5,1)^T$ and the vector $v''_{1,1}=(2,4)^T$ indicate the attribute values in the first table and the attribute values in the second table, for the keys "1" and "3" common to the first table and the second table.

According to this embodiment, it is possible to obtain attribute values in the first table and attribute values in the second table, for keys common to the first table and the second table while maintaining confidentiality.

[Modification]

Note that, when x is a positive integer equal to or larger than 2, a key attribute may be a composite key for x attributes. In this case, the process of step S1 may be performed, for example, as below.

It is assumed that keys of the first table are $k_{0,0}, \ldots, k_{0,x-1}$. It is assumed that keys of the second table are $k_{1,0}, \ldots, k_{1,x-1}$.

In this case, at the process of step S1, $k_{0,i}$ and $k_{1,i}$ are joined for each i to obtain $k'_i$ (i=0, ..., x−1). Then, each $k'_i$ is bit-decomposed to obtain a bit expression, and the bit expressions are horizontally joined. For example, when $k'_0=(1,2,3,1,3,0,1)^T$ and $k'_1=(0,0,0,0,0,1,1)^T$ are assumed, $(k'_0)_0=(1,0,1,1,1,0,1)^T$ and $(k'_0)_1=(0,1,1,0,1,0,0)^T$ are obtained by bit-decomposing $k'_0$.

Here, since $k'_0$ takes a value between 1 and 3, including 1 and 3, each element of $k'_0$ can be expressed in two bits. Here, $(k'_0)_0$ are low-order bits when $k'_0$ is bit-decomposed, and $(k'_0)_1$ are high-order bits when $k'_0$ is bit-decomposed. Since $k'_1$ is originally a 1-bit number in this example, decomposition is not required, and $k'_1=(k'_1)_0$ is assumed. When $(k'_0)_0$, $(k'_0)_1$ and $(k'_1)_0$ are horizontally joined, the following can be obtained.

$$\begin{pmatrix} 1,0,1,1,1,0,1 \\ 0,1,1,0,1,0,0 \\ 0,0,0,0,0,1,1 \end{pmatrix}^T \qquad \text{[Formula 4]}$$

When what are arranged as above is regarded as a matrix, and each row of this matrix is regarded as a bit expression of a key of one record, a vector of bit expressions of keys of (1,2,3,1,3,4,5) is obtained. This vector may be used as k' used at and after step S2. In this way, processing can be also performed for the case of a composite key.

In the case of a composite key, key duplication refers to whether duplication occurs in terms of combinations of all key attribute values, and it is assumed that, even if individual attribute values are duplicate, it is not regarded as duplication. For example, combinations of (1,0) and (1,1) are not duplicate.

The embodiment of this invention has been described above. However, a specific configuration is not limited to the embodiment, and it goes without saying that, even if design changes and the like are appropriately made within a range not departing from the spirit of this invention, the configuration is included in this invention.

Various kinds of processes described in the embodiment are not only executed in time series in order of the description but also may be executed in parallel or individually according to processing capability of an apparatus that executes the processes or as necessary.

[Program and Recording Medium]

Figure 4:
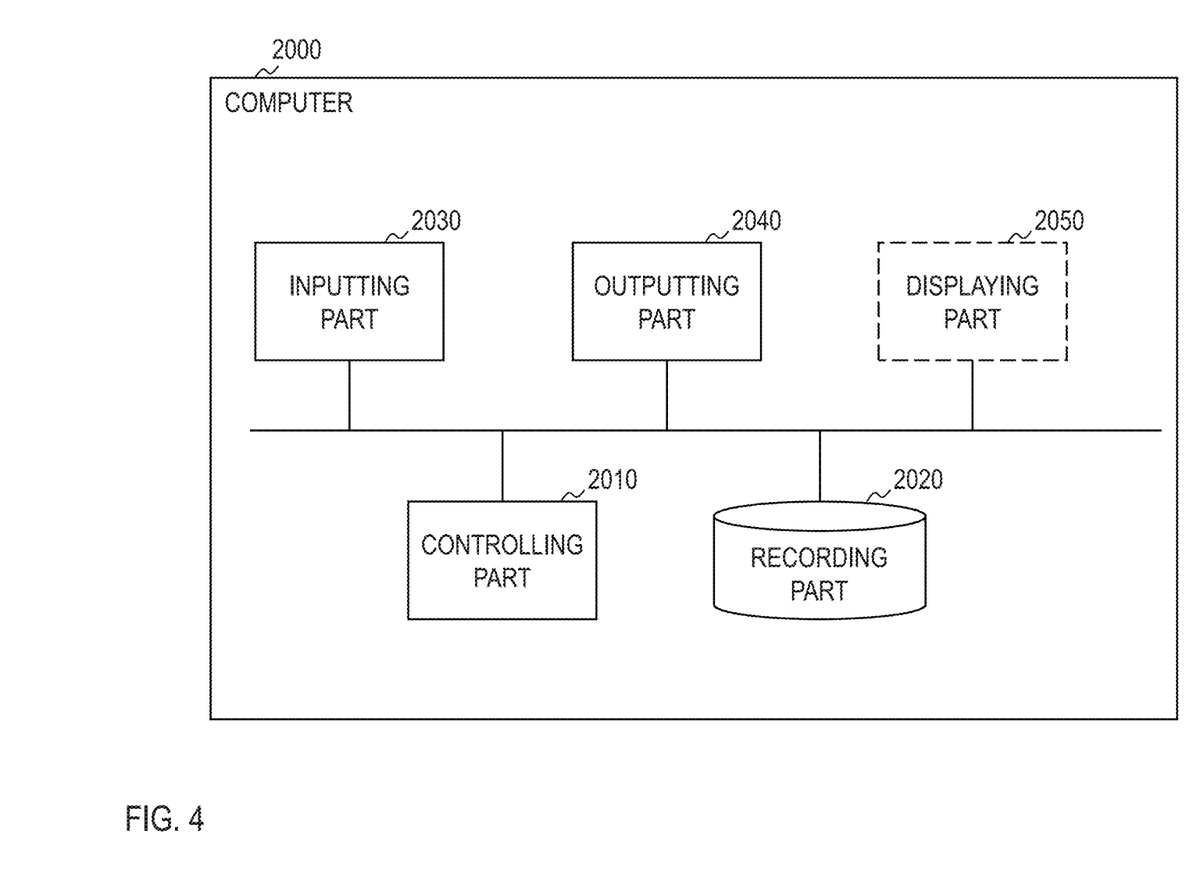
FIG. 4 is a diagram illustrating a functional configuration example of a computer.

The various kinds of processes described above can be performed by causing a recording part 2020 of a computer shown in FIG. 4 to read a program that causes each step of the above method to be executed, and causing a controlling part 2010, an inputting part 2030, an outputting part 2040 and the like to operate.

The program in which the processing content is written can be recorded in a computer-readable recording medium. As the computer-readable recording medium, anything is possible, for example, a magnetic recording device, an optical disk, a magneto-optical recording medium or a semiconductor memory.

Distribution of this program is performed, for example, by performing sales, transfer, lending or the like of a portable recording medium such as a DVD or a CD-ROM in which the program is recorded. Furthermore, a configuration is also possible in which this program is stored in a storage device of a server computer, and is distributed by being transferred from the server computer to other computers via a network.

For example, a computer that executes such a program first stores the program recorded in a portable recording medium or transferred from a server computer into its own storage device once. Then, at the time of executing a process, the computer reads the program stored in its own storage device and executes the process according to the read program. Further, as another execution execution form of this program, the computer may directly read the program from the portable recording medium and execute the process according to the program. Furthermore, each time a program is transferred to the computer from the sever computer, the computer may sequentially execute a process according to the received program. Further, a configuration is also possible in which the above process is executed by a so-called ASP (application service provider) type service in which, without transferring the program to the computer from the server computer, the processing functions are realized only by an instruction to execute the program and acquisition of a result. It is assumed that the program in this form includes information which is provided for processing by an electronic calculator and is equivalent to a program (data or the like which is not a direct command to the computer but has a nature of specifying processing of the computer).

Further, though it is assumed in this form that the apparatus is configured by causing a predetermined program to be executed on a computer, at least a part of the processing content may be realized as hardware.

What is claimed is:

1. A secure joining system comprising:
   a plurality of secure computation apparatuses, wherein
   F is an arbitrary ring, $[\alpha]$ represents shares obtained by $\alpha$ being secret-shared while maintaining confidentiality when $\alpha$ is an arbitrary vector, $\{\{\beta\}\}$ represents shares obtained by $\beta$ being secret-shared while maintaining confidentiality when $\beta$ is an arbitrary permutation, $m_0$, $m_1$, $L_0$ and $L_1$ are integers equal to or larger than 1, $k_0 \in F^{m_0}$ is a vector of keys of a first table, $k_1 \in F^{m_1}$ is a vector of keys of a second table, $v_{0,p} \in F^{m_0}$ is a vector of attribute values of attributes p of the first table when $p=0, \ldots, L_0-1$ is assumed, $v_{1,q} \in F^{m_1}$ is a vector of attribute values of attributes q of the second table when $q=0, \ldots, L_1-1$ is assumed, and $\pi_0$ and $\pi_1$ are predetermined permutations of lengths $m_0$ and $m_1$, respectively; and
   the plurality of secure computation apparatuses comprise:
   processing circuitry configured to
   generate shares [k'] of a vector $k' \in [F]^{m_0+m_1}$ obtained by joining the vector $k_0$ and the vector $k_1$, using shares $[k_0]$ of the vector $k_0$ and shares $[k_1]$ of the vector $k_1$;
   generate shares $\{\{\sigma\}\}$ of a permutation $\sigma$ that performs stable sorting of the vector k' in ascending order, using the shares [k'];
   generate shares $[\sigma(k')]$ of a vector $\sigma(k')$ obtained by applying the permutation $\sigma$ to the vector k', using the shares [k'] and the shares $\{\{\sigma\}\}$;
   generate shares [e] of a vector e that has 1 as an element corresponding to a certain element of the vector $\sigma(k')$ if the certain element and an element next to the certain element are the same and has 0 as the element corresponding to the certain element if the certain element and the element next to the certain element are different, using the shares $[\sigma(k')]$;
   generate shares [e'] of a vector e' that has 1 as an element corresponding to a certain element of the vector e if one of the certain element and an element before the certain element is 1 and, otherwise, has 0 as the element corresponding to the certain element, using the shares [e];
   generate shares [e"] of a vector e" obtained by bit-flipping each element of the vector e', using the shares [e'];
   generate shares $\{\{\sigma'\}\}$ of a permutation $\sigma'$ that performs stable sorting of the vector e" in ascending order, using the shares [e"];
   generate shares $[\sigma'(e")]$ of a vector $\sigma'(e")$ obtained by applying the permutation $\sigma'$ to the vector e", using the shares [e"] and the shares $\{\{\sigma'\}\}$;
   generate shares [x] of a vector x that has $\lfloor i/2 \rfloor$ as an element corresponding to a certain element i of the vector $\sigma'(e")$ if the certain element i is 0 and has 0 as the element corresponding to the certain element i if the certain element i is not 0, using the shares $[\sigma'(e")]$;

generate shares $[\sigma^{-1}(\sigma'^{-1}(x))]$ of a vector $\sigma^{-1}(\sigma'^{-1}(x))$ obtained by applying an inverse permutation $\sigma'^{-1}$ of the permutation $\sigma'$ and an inverse permutation $\sigma^{-1}$ of the permutation $\sigma$ to the vector x, using the shares [x], the shares $\{\{\sigma\}\}$ and the shares $\{\{\sigma'\}\}$;

generate shares $[s_0]$ of a vector $s_0$ composed of $m_0$ elements from the top of the vector $\sigma^{-1}(\sigma'^{-1}(x))$ and shares $[s_1]$ of a vector $s_1$ composed of remaining $m_1$ elements of the vector $\sigma^{-1}(\sigma'^{-1}(x))$, using the shares $[\sigma^{-1}(\sigma'^{-1}(x))]$;

generate shares $[\pi_0(s_0)]$ of a vector $\tau_0:=\pi_0(s_0)$ obtained by applying a permutation $\pi_0$ to the vector $s_0$ and shares $[\pi_1(s_1)]$ of a vector $\tau_1:=\pi_1(s_1)$ obtained by applying a permutation $\pi_1$ to the vector $s_1$, using the shares $[s_0]$, the shares $[s_1]$ and the permutations $\pi_0$ and $\pi_1$, and publishing $\tau_0:=\pi_0(s_0)$ and $\tau_1:=\pi_1(s_1)$;

generate shares $[v'_{0,p}]$ of a vector $v'_{0,p}$ obtained by permutating a vector $v_{0,p}$ of attribute values of the attributes p of the first table by the permutation $\pi_0$ and shares $[v'_{1,q}]$ of a vector $v'_{1,q}$ obtained by permutating a vector $v_{1,q}$ of attribute values of the attributes q of the second table by the permutation $\pi_1$, using the shares $\{\{\pi_0\}\}$ of the permutation $\pi_0$, the shares $\{\{\pi_1\}\}$ of the permutation $\pi_1$, the shares $[v_{0,p}]$ of the vector $v_{0,p}$ and the shares $[v_{1,q}]$ of the vector $v_{1,q}$; and generate shares $[v''_{0,p}]$ of a vector $v''_{0,p}$ that has the i'-th element of the vector $v'_{0,p}$ as the (i'−1)th element if the i'-th element of the vector $\tau_0$ is not 0, and shares $[v''_{1,q}]$ of a vector $v''_{1,q}$ that has the i'-th element of the vector $v'_{1,q}$ as the (i'−1)th element if the i'-th element of the vector $\tau_1$ is not 0, using the vector $\tau_0$, the vector $\tau_1$, the shares $[v'_{0,p}]$ and the shares $[v'_{1,q}]$.

2. A secure joining method, wherein

F is an arbitrary ring, $[\alpha]$ represents shares obtained by $\alpha$ being secret-shared while maintaining confidentiality when $\alpha$ is an arbitrary vector, $\{\{\beta\}\}$ represents shares obtained by $\beta$ being secret-shared while maintaining confidentiality when $\beta$ is an arbitrary permutation, $m_0$, $m_1$, $L_0$ and $L_1$ are integers equal to or larger than 1, $k_0 \in F^{m0}$ is a vector of keys of a first table, $k_1 \in F^{m1}$ is a vector of keys of a second table, $v_{0,p} \in F^{m0}$ is a vector of attribute values of attributes p of the first table when p=0, . . . , $L_0$−1 is assumed, $v_{1,q} \in F^{m1}$ is a vector of attribute values of attributes q of the second table when q=0, . . . , $L_1$−1 is assumed, and $\pi_0$ and $\pi_1$ are predetermined permutations of lengths $m_0$ and $m_1$, respectively; and the secure joining method comprises:

a vector joining step of a plurality of vector joining parts generating shares [k'] of a vector $k' \in [F]^{m0+m1}$ obtained by joining the vector $k_0$ and the vector $k_1$, using shares $[k_0]$ of the vector $k_0$ and shares $[k_1]$ of the vector $k_1$;

a first permutation calculating step of a plurality of first permutation calculating parts generating shares $\{\{\sigma\}\}$ of a permutation a that performs stable sorting of the vector k' in ascending order, using the shares [k'];

a first permutation applying step of a plurality of first permutation applying parts generating shares $[\sigma(k')]$ of a vector $\sigma(k')$ obtained by applying the permutation $\sigma$ to the vector k', using the shares [k'] and the shares $\{\{\sigma\}\}$;

a first vector generating step of a plurality of first vector generating parts generating shares [e] of a vector e that has 1 as an element corresponding to a certain element of the vector $\sigma(k')$ if the certain element and an element next to the certain element are the same and has 0 as the element corresponding to the certain element if the certain element and the element next to the certain element are different, using the shares $[\sigma(k')]$;

a second vector generating step of a plurality of second vector generating parts generating shares [e'] of a vector e' that has 1 as an element corresponding to a certain element of the vector e if one of the certain element and an element before the certain element is 1 and, otherwise, has 0 as the element corresponding to the certain element, using the shares [e];

a bit-flipping step of a plurality of bit-flipping parts generating shares [e''] of a vector e'' obtained by bit-flipping each element of the vector e', using the shares [e'];

a second permutation calculating step of a plurality of second permutation calculating parts generating shares $\{\{\sigma'\}\}$ of a permutation $\sigma'$ that performs stable sorting of the vector e'' in ascending order, using the shares [e''];

a second permutation applying step of a plurality of second permutation applying parts generating shares $[\sigma'(e'')]$ of a vector $\sigma'(e'')$ obtained by applying the permutation $\sigma'$ to the vector e'', using the shares [e''] and the shares $\{\{\sigma'\}\}$;

a third vector generating step of a plurality of third vector generating parts generating shares [x] of a vector x that has $\lfloor i/2 \rfloor$ as an element corresponding to a certain element i of the vector $\sigma'(e'')$ if the certain element i is 0 and has 0 as the element corresponding to the certain element i if the certain element i is not 0, using the shares $[\sigma'(e'')]$;

an inverse permutation applying step of a plurality of inverse permutation applying parts generating shares $[\sigma^{-1}(\sigma'^{-1}(x))]$ of a vector $\sigma^{-1}(\sigma'^{-1}(x))$ obtained by applying an inverse permutation $\sigma'^{-1}$ of the permutation $\sigma'$ and an inverse permutation $\sigma^{-1}$ of the permutation $\sigma$ to the vector x, using the shares [x], the shares $\{\{\sigma\}\}$ and the shares $\{\{\sigma'\}\}$;

a vector separating step of a plurality of vector separating parts generating shares $[s_0]$ of a vector $s_0$ composed of $m_0$ elements from the top of the vector $\sigma^{-1}(\sigma'^{-1}(x))$ and shares $[s_1]$ of a vector $s_1$ composed of remaining $m_1$ elements of the vector $\sigma^{-1}(\sigma'^{-1}(x))$, using the shares $[\sigma^{-1}(\sigma'^{-1}(x))]$;

a third permutation applying step of a plurality of third permutation applying parts generating shares $[\pi_0(s_0)]$ of a vector $\tau_0:=\pi_0(s_0)$ obtained by applying a permutation $\pi_0$ to the vector $s_0$ and shares $[\pi_1(s_1)]$ of a vector $\tau i:=\pi_1(s_1)$ obtained by applying a permutation $\pi_1$ to the vector $s_1$, using the shares $[s_0]$, the shares $[s_1]$ and the permutations $\pi_0$ and $\pi_1$, and publishing $\tau_0:=\pi_0(s_0)$ and $\tau_1:=\pi_1(s_1)$;

an attribute value permutating step of a plurality of attribute value permutating parts generating shares $[v'_{0,p}]$ of a vector $v'_{0,p}$ obtained by permutating a vector $v_{0,p}$ of attribute values of the attributes p of the first table by the permutation $\pi_0$ and shares $[v'_{1,q}]$ of a vector $v'_{1,q}$ obtained by permutating a vector $v_{1,q}$ of attribute values of the attributes q of the second table by the permutation $\pi_1$, using the shares $\{\{\pi_0\}\}$ of the permutation $\pi_0$, the shares $\{\{\pi_1\}\}$ of the permutation $\pi_1$, the shares $[v_{0,p}]$ of the vector $v_{0,p}$ and the shares $[v_{1,q}]$ of the vector $v_{1,q}$; and a fourth vector generating step of a plurality of fourth vector generating parts generating shares $[v''_{0,p}]$ of a vector $v''_{0,p}$ that has the i'-th element of the vector $v'_{0,p}$ as the (i'−1)th element if the i'-th element of the vector $\tau_0$ is not 0, and shares $[v''_{1,q}]$ of a vector $v''_{1,q}$ that has the i'-th element of the vector $v'_{1,q}$ as the (i'−1)th element if the i'-th element of the vector $\tau_1$ is not 0, using the vector $\tau_0$, the vector $\tau_1$, the shares $[v'_{0,p}]$ and the shares $[v'_{1,q}]$.

3. One or more non-transitory computer readable medium that store a program for causing one or more computers to perform the method of claim 2.

* * * * *

UNITED STATES PATENT AND TRADEMARK OFFICE
CERTIFICATE OF CORRECTION

PATENT NO. : 11,797,540 B2  
APPLICATION NO. : 17/252290  
DATED : October 24, 2023  
INVENTOR(S) : Dai Ikarashi et al.

Page 1 of 1

It is certified that error appears in the above-identified patent and that said Letters Patent is hereby corrected as shown below:

In the Claims

Column 14, Line 62, "shares $[v_{0,p}]$ of the vector $v_{0,p}$ and the shares $[v_{1,q}]$ of" should be -- shares $[v_{0,p}]$ of the vector $v_{0,p}$ and the shares $[v_{1,q}]$ of --.

Signed and Sealed this  
Fifth Day of December, 2023

Katherine Kelly Vidal  
*Director of the United States Patent and Trademark Office*